Patented Jan. 11, 1944

2,339,002

UNITED STATES PATENT OFFICE 2,339,002

OXIDATIVE CONDENSATION PRODUCT OF ORGANIC MERCAPTANS AND PRIMARY AMINES

Robert H. Cooper, Nitro, W. Va., assignor to Monsanto Chemical Company, St. Louis, Mo., a corporation of Delaware No Drawing. Application July 26, 1940,
Serial No. 347,788

9 Claims. (Cl. 260—306.6)

The present invention relates to the preparation of oxidative condensation products of organic mercaptans and primary amines and has specific reference to the oxidative condensation of mercapto thiazoles and primary amines.

The formation of oxidative condensation products from organic mercaptans and secondary amines is well known but while cyclohexylamine and benzylamine behave in similar manner (U. S. 2,191,657 to Harman) the substitution of most primary amines has not met with success. However, this invention provides a method whereby a natural group of primary amines may be condensed with organic mercaptans.

It has been found in accordance with this invention that any primary amine stronger than ammonia will form oxidative condensation products with organic mercaptans providing there is employed at least three molecular proportions of amine for each molecular proportion of mercaptan and the oxidation carried out in the absence of strong alkali. That is to say the primary amines which are operative in the present process possess dissociation constants greater than $1.8 \times 10^{-5}$, the dissociation constant for ammonia. As exemplary of such amines there may be mentioned cyclohexylamine, benzylamine, methylamine, ethylene diamine, n-butylamine, n-amylamine, ethylamine, propylamine, o-cyclohexyl cyclohexylamine, allylamine, hexahydrobenzylamine, ethanolamine and equivalents and analogues thereof. By the absence of strong alkali is meant the absence of caustic soda or other alkaline material except of course the amine entering into the reaction. In prior methods for preparing oxidative condensation products of primary amines and organic mercaptans the reaction is carried out in the presence of strong inorganic alkali either with control of the pH so that the original alkalinity is kept constant as in U. S. 2,268,467 granted to George W. Ashworth or in the presence of inorganic alkali sufficient in conjunction with the primary amine to provide a strongly alkaline reaction medium, preferably containing at least two equivalents of inorganic alkali to each equivalent of mercaptan as in U. S. 2,271,834 granted to Edward L. Carr. However, according to the present invention which contemplates no control of the pH during the reaction nor large excess of inorganic alkali, it has been found that the inorganic alkali can be eliminated and in fact must be left out altogether in order to obtain good results.

Any organic mercaptans may be used in the present process. Typical examples include thio phenol, thio β naphthol, 2 mercapto thiazoline, 2 mercapto 4, 5 dihydro glyoxaline, 2 mercapto benzimidazole, 2 mercapto benzoxazole, 2 mercapto 4,5 dimethyl thiazole, 2 mercapto 4-ethyl thiazole and particularly 2 mercapto aryl thiazoles as for example 2-mercaptobenzothiazole, 2-mercapto naphthothiazole, 2-mercapto 4-phenylbenzothiazole, 2-mercapto methyl benzothiazole, 2-mercapto chlorbenzothiazole and equivalents and analogues thereof.

Due to their cheapness the hypochlorites are the oxidizing agents preferred and give excellent results in the process. However, other oxidizing agents may be used where convenient or desirable, typical examples comprising hydrogen peroxide, chlorine, potassium ferricyanide, potassium persulfate and the like.

The following specific examples are to be understood as illustrative of the invention but in nowise limitative of the scope thereof.

EXAMPLE I

Into a suitable reaction vessel fitted with an efficient stirrer there was charged 55 parts by weight (substantially 0.3 molecular proportions) of substantially 90.5% mercaptobenzothiazole suspended in 300 parts by weight of water and 90 parts by weight (substantially 0.9 molecular proportions) of cyclohexylamine added thereto. To this charge at 35° C. and with good stirring there was slowly added about 307 parts by weight of 10% sodium hypochlorite (substantially 0.415 molecular proportions). After completion of the reaction the cyclohexylamino thio benzothiazole was filtered from the aqueous vehicle, washed and dried. The yield was 90.2% of theory.

Of course mercaptobenzothiazole of a higher purity may be used but one advantage of the process of the present invention is that it permits the use of relatively crude mercaptans thus eliminating expensive purification steps. The excess of amine appears to exert a solvent effect on the impurities thereby preventing contamination of the product. The amine which is not used up in the reaction may be removed by any suitable means and used for subsequent reactions.

EXAMPLE II

Substantially 17 parts by weight of 98% mercaptobenzothiazole (0.1 molecular proportions) was slurried in 200 parts by weight of water in a suitable vessel fitted with an efficient stirrer and then 22 parts by weight of secondary monobutylamine (substantially 0.3 molecular proportions) were added to the suspension so prepared.

Over a period of about an hour substantially 0.11 molecular proportions of sodium hypochlorite solution were added to the efficiency stirred charge at 26–28° C. After completion of the reaction the mix was filtered and the separated solids washed with water, dried and then extracted with a suitable organic solvent as for example ether. The solvent was then removed leaving as a residue an 81% yield of secondary butyl amino thio benzothiazole, M. P. 53–57° C.

EXAMPLE III

Substantially 51 parts by weight of 98% mercaptobenzothiazole (0.3 molecular proportions) were suspended in 300 parts by weight of water and 183 parts by weight (3.0 molecular proportions) of monoethanolamine added thereto. To the efficiency stirred mix there was added over a period of about 2 hours at 34–36° C., 231 parts by weight of a 10.1% solution of sodium hypochlorite (0.33 molecular proportions). After completion of the reaction the precipitated solids were filtered off, washed with water and dried. The product was then taken up in a suitable organic solvent such as ether, the solution filtered and the solvent removed by any convenient means. The residue comprising the desired β hydroxy ethyl amino thio benzothiazole, melted at 90–99° C.

EXAMPLE IV

Substantially 51 parts by weight of 98% mercaptobenzothiazole (0.3 molecular proportions) were suspended in 300 parts by weight of water and 90 parts by weight of cyclohexylamine (0.9 molecular proportions) added thereto. The charge was heated slightly to effect solution and then to the efficiently stirred mix at 40° C. there was added substantially 102 parts by weight of a 10% solution of hydrogen peroxide. About two hours were required for the addition and stirring was continued for about thirty minutes longer after which the mass was cooled to 20° C., filtered, the product washed until neutral and dried. A good yield of cyclohexylamino thio benzothiazole of exceptionally high purity was obtained.

EXAMPLE V

Substantially 17 parts by weight of 98% mercaptobenzothiazole (0.1 molecular proportions) were suspended in 150 parts by weight of water and 53.5 parts by weight (0.3 molecular proportions) of o-cyclohexyl cyclohexylamine added thereto. The charge was heated slightly to effect solution and then cooled to 40° C. To the efficiently stirred mix at about 39–41° C. there was added over a period of about seventy minutes 115 parts by weight of an approximately 7.1% solution of sodium hypochlorite. After completion of the reaction the precipitated solids were filtered off, washed with water and dried. The dry product was then taken up in suitable organic solvent such as ether, filtered and the ether solution washed with a 2% caustic soda solution and then with weak sulfuric acid until neutral. The solvent was removed to leave a good yield of o-cyclohexyl cyclohexylamino thio benzothiazole as a waxy buff colored solid.

EXAMPLE VI

Substantially 51 parts by weight of 98% mercaptobenzothiazole (0.3 molecular proportions) were suspended in 300 parts by weight of water and 85 parts by weight (0.9 molecular proportions) of 33% methyl amine added thereto. To the efficiently stirred mix there was added over a period of about 105 minutes at 30–36° C. 346 parts by weight of an approximately 7.1% solution of sodium hypochlorite. After completion of the reaction the putty like mass which had precipitated was taken up in a suitable solvent as for example ether and the ether extracts washed with dilute caustic soda and then with water until neutral. The desired methylamino thio benzothiazole was obtained after removal of the solvent, as a low melting solid.

In general the products of this invention are valuable accelerators of the vulcanization of rubber and as such may be used both alone or in conjunction with basic nitrogen containing accelerators as activators thereof. Examples of the latter include guanidines such as diphenyl guanidine, di-o-tolyl guanidine and diphenyl guanidine phthalate. Other examples are aldehyde-amines. The condensation products of mercapto aryl thiazoles and primary amines combine the great advantages of ample processing safety and powerful acceleration. As illustrative of the accelerating properties rubber stocks were compounded comprising

|  | Stock | |
|---|---|---|
|  | 1 | 2 |
| Pale crepe rubber | 100 | 100 |
| Zinc oxide | 10 | 10 |
| Sulfur | 3 | 3 |
| Stearic acid | 0.5 | 0.5 |
| β hydroxy ethylamino thio benzothiazole | 0.5 | 0.5 |
| Diphenyl guanidine |  | 0.25 |

The stocks so compounded were cured by heating in a press at the temperature of 20 pounds steam pressure per square inch. The following are the physical properties of the vulcanizates.

Table

| Stock | Cure time in mins. | Modulus of elasticity in lbs./in.² at elongations of— | | Tensile at break in lbs./in.² | Ult. elong., per cent |
|---|---|---|---|---|---|
|  |  | 500% | 700% |  |  |
| 1 | 30 | 150 | 470 | 2,025 | 995 |
| 2 | 30 | 1,030 | 4,080 | 4,700 | 730 |
| 1 | 60 | 585 | 2,370 | 4,100 | 810 |
| 2 | 60 | 1,490 | 5,000 | 5,000 | 700 |

The above data show the very desirable accelerating properties of the products of this invention.

As appears from the foregoing description catalysts are unnecessary for carrying out the oxidation. Again other oxidizing agents may be employed where desired and where preferred, inert organic solvents may be substituted for the cheaper aqueous vehicle. Obviously the details of the operations specifically described may be widely varied without departing from the spirit or scope of this invention. This invention is limited solely by the claims attached hereto as part of the present specification.

What is claimed is:

1. The method of making condensation products of organic mercaptans and primary amines which comprises oxidizing in solution an admixture initially comprising one molecular proportion of a free organic mercaptan and at least three molecular proportions of a primary amine stronger than ammonia.

2. The method of making condensation products of organic mercaptans and primary amines which comprises oxidizing in solution an admixture initially comprising one molecular proportion of a free mercapto thiazole and at least three molecular proportions of a primary amine stronger than ammonia.

3. The method of making condensation products of organic mercaptans and primary amines which comprises oxidizing in solution an admixture initially comprising one molecular proportion of a free mercapto aryl thiazole and at least three molecular proportions of a primary amine stronger than ammonia.

4. The method of making condensation products of organic mercaptans and primary amines which comprises oxidizing in aqueous solution by means of a hypochlorite a solution initially comprising one molecular proportion of a free mercapto aryl thiazole and at least three molecular proportions of a primary amine stronger than ammonia.

5. The method of making condensation products of organic mercaptans and primary amines which comprises oxidizing in aqueous solution by means of a hypochlorite a solution initially comprising one molecular proportion of a free mercaptobenzothiazole and at least three molecular proportions of a primary amine stronger than ammonia.

6. The method of making condensation products of organic mercaptans and primary amines which comprises oxidizing in aqueous solution by means of an alkali metal hypochlorite an admixture initially comprising one molecular proportion of free mercaptobenzothiazole and at least three molecular proportions of a primary amine stronger than ammonia.

7. The method of making condensation products of organic mercaptans and primary amines which comprises oxidizing in aqueous solution an admixture initially comprising one molecular proportion of a free mercapto aryl thiazole and at least three molecular proportions of cyclohexylamine.

8. The method of making condensation products of organic mercaptans and primary amines which comprises oxidizing in aqueous solution by means of a hypochlorite an admixture initially comprising one molecular proportion of a free mercapto aryl thiazole and at least three molecular proportions of cyclohexylamine.

9. As a new chemical product β hydroxy ethyl amino thio benzothiazole possessing the structural formula of

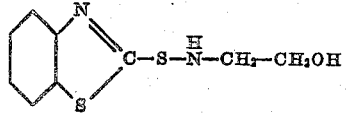

ROBERT H. COOPER.